Aug. 30, 1960    K. M. NICOLSON    2,950,929
SAFETY JOINT
Filed March 29, 1957
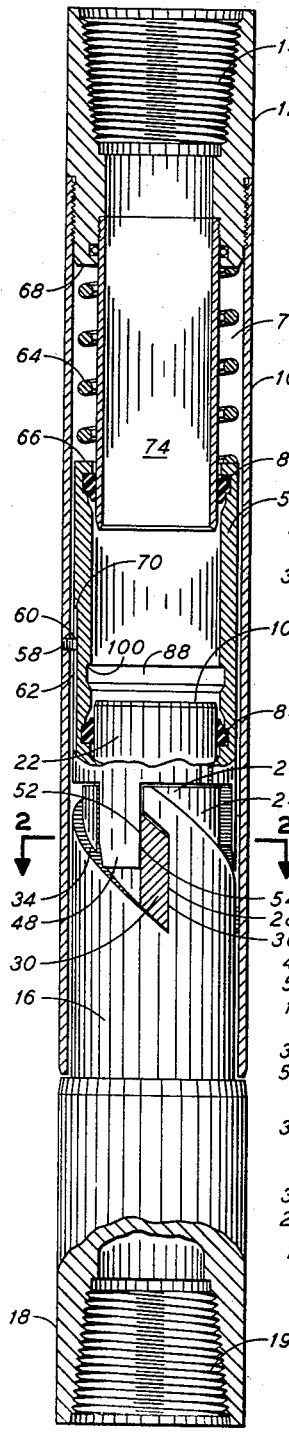
FIG.1
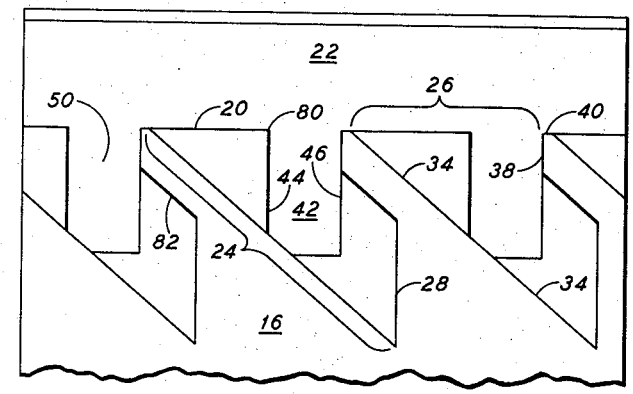
FIG.3
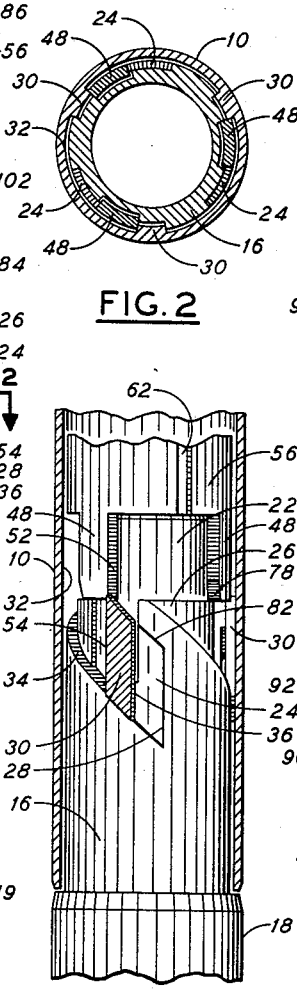
FIG.2
FIG.5
FIG.6
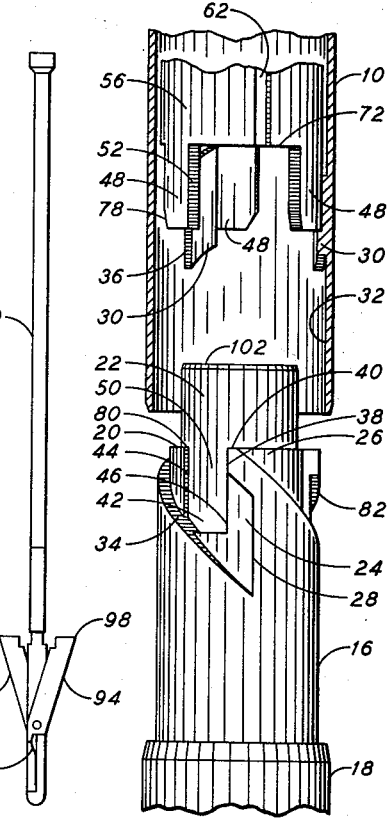
FIG.4
INVENTOR
KINGSLEY M. NICOLSON
BY
ATTORNEYS United States Patent Office 2,950,929
Patented Aug. 30, 1960

2,950,929

SAFETY JOINT

Kingsley M. Nicolson, Fullerton, Calif., assignor, by mesne assignments, to California Research Corporation, San Francisco, Calif., a corporation of Delaware Filed Mar. 29, 1957, Ser. No. 649,505

4 Claims. (Cl. 285—86)

This invention relates to a safety joint for use with oil well apparatus and more particularly to a safety joint for detachably connecting two elements together automatically in a manner to permit a torque to be applied between them in either direction of rotation without releasing the connection.

Safety joint devices are familiar to the drilling art where their use in apparatus for fishing stuck drill pipe or tubing from a bore hole is well known. They have been proposed for use also in drill strings and to connect sucker rods to pumps. The present invention is directed to a novel safety joint structure which may be used with well casing, as well as the other suggested types of apparatus, to connect automatically two parts of the casing string and lock them together. The construction of the safety joint is such that it will permit rotation of the connected elements in either direction, a condition which is desirable if the safety joint is used to connect a drill bit to a string of drill pipe, while the safety joint remains securely locked against disengagement. This safety joint requires comparatively little relative rotation of one part of the apparatus with respect to the other when the joint is being connected and the required rotation occurs through the interaction of the parts of the joint as they engage. It incorporates also a positively actuated means for unlocking and disconnecting the joint.

It is an object of this invention to provide a novel safety joint which will be positive in action to connect and lock two elements together automatically in a manner to permit rotation of the connected elements in either direction without releasing the joint.

It is a further object of this invention to provide a novel safety joint which incorporates a means automatically to lock the joint against accidental disengagement and which means can be manipulated at the will of the operator to cause the joint to be disconnected.

Still another object of this invention is to provide a safety joint which automatically will become connected when the parts are telescoped together in an axial direction without positively rotating one part relative to the other by a means external to the safety joint and, conversely, which can be disconnected by an axial displacement of the connected elements without positively rotating one part relative to the other by a means external of the safety joint.

Other objects will become apparent as the description of the invention proceeds in conjunction with the accompanying drawings which form part of this specification.

The safety joint of this invention employs a mandrel which is telescopically received within a barrel and is then locked thereto. The mandrel has a plurality of similar helical channels formed in its circumferential surface to receive respective driving lugs which are integral with and extend inwardly from the inner surface of the barrel. The pitch of the helix is such that when the driving lugs engage the helical channels and pressure is applied to them in an axial direction the reaction between the lugs and the helices will cause the barrel to rotate relative to the mandrel until the driving lugs abut the ends of the channels. Locking keys are then automatically inserted across the helical channels and adjacent the driving lugs to hold the latter in place. When the locking keys are withdrawn and the connected members are placed in tension, the driving lugs will cooperate with the helices to cause the barrel to rotate relative to the mandrel until the driving lugs are clear of the channels and the joint is disconnected. This joint may be used, therefore, to join together elements which are not arranged to be positively rotated by external means, as well as those which are designed to be so rotated.

In the drawings:

Figure 1 illustrates in elevation and partly in section an assembly view of the safety joint with the parts connected in operative relationship.

Figure 2 illustrates in plan view a section of the safety joint assembly taken along the line 2—2 of Figure 1.

Figure 3 is a diagrammatic illustration of the appearance of the helical channels and keyways in the mandrel of the safety joint when developed on a plane surface.

Figure 4 illustrates in elevation and partly in section a portion of the safety joint, and shows the positions of the parts when the barrel is disconnected from the mandrel.

Figure 5 illustrates in elevation and partly in section a portion of the safety joint, and shows the positions of the parts after the barrel has engaged the mandrel but before they are locked together.

Figure 6 is a view in elevation of a releasing tool for the safety joint.

The safety joint of this invention will be described as connecting two portions of a casing string, although it will be apparent that this is by way of example only and that the safety joint can be applied to other structures, such as drill tubing or sucker rods, without departing from the inventive concept.

The safety joint comprises a barrel 10 which forms the outer shell of the structure. One end of the barrel is attached to an end of a collar 12 which has standard screw threads 14 at its free end by which it is adapted to be connected in a casing string. The other end of the barrel is open to receive the end portion 16 of a mandrel 18 in telescopic relationship. The mandrel also is adapted to be connected in a casing string, as by standard screw threads 19. The barrel and mandrel are made to fit snugly together, but with sufficient clearance between the parts to permit the mandrel to move freely longitudinally and in rotation relative to the barrel. The radially outer surface of the end portion of the mandrel received within the barrel is generally cylindrical in configuration and of uniform external diameter to a location adjacent its end, at which point the diameter is reduced at the shoulder 20. The mandrel extends beyond this shoulder in a cylindrical extension 22 of a uniform external diameter less than that of the principal end portion of the mandrel.

In the present exemplary embodiment of the invention three similar helical channels 24, spaced 120° apart, are formed in the circumferential surface of the cylindrical portion 16 of the mandrel. These channels have an entrance 26 at the shoulder 20 and extend continuously from the shoulder circumferentially along the cylindrical surface to a termination at an end wall 28, which preferably lies in a plane intersecting the axis of the mandrel. Each helical channel is designed to receive in close sliding contact a respective driving lug 30 which extends inwardly from the inner surface 32 of the barrel and is made unitary with the barrel or rigidly fixed thereto. The slope or pitch of the helical channel is made sufficiently steep to produce a tangential reaction between the transverse wall 34 of the channel and the edge surface of the driving lug engaging it, of sufficient force to cause the barrel to rotate relative to the mandrel as the parts are telescoped together. The driving lug thus will proceed along the channel until its side face 36 rests against the wall 28 at the termination of the channel, preventing further rotation of the parts in this direction. It will be appreciated that the pitch of the helix required for this result will vary with the material of which the parts are made, the substances with which they may be lubricated or contaminated, and the conditions of use. For a casing safety joint of steel, designed for a particular installation, a helix having a slope of approximately 40° to the transverse axis of the mandrel has been found to be satisfactory, while a slope of 20° did not produce automatic coupling.

As shown in Figure 3 the transverse edge surface 34 of one helical channel terminates on the shoulder 20 in a position closely adjacent to the boundary edge surface 38 of the entrance for the next succeeding helical channel. The helical channels are formed in the mandrel so that there will be a negligible amount of flat surface 40 on the shoulder 20 between succeeding channels. Thus when the barrel and mandrel are forced together the driving lugs will immediately engage the inclined transverse surfaces of their respective helical channels without the necessity of relatively rotating the parts by some external means until engagement is accomplished. The entrance 26 of each helical channel is of sufficient width to enable the driving lugs to enter their respective channels with no difficulty to engage the helical surfaces 34 when the parts are brought together.

When the driving lugs reach the terminus of their complementary helical channels it is desired to lock them in position to prevent relative rotation between the barrel and mandrel in either direction. To accomplish this, similar keyways 42 are formed in the radially exterior surface of the cylindrical portion 16 of the mandrel in a position generally transversely of each of the helical channels. Each keyway is of greater depth than its respective helical channel, so that it extends farther into the body of the mandrel and has its own axially disposed boundary walls 44 and 46. Each keyway is open at the position of the shoulder 20 to receive a locking key 48 which can be slidably inserted into it. The locking key is made of sufficient thickness to extend from the bottom wall 50 of the keyway out into and across its respective helical channel and of sufficient width to closely approach the axial boundary walls of the keyway in sliding contact. The keyway is positioned on the mandrel to place the edge wall 52 of the locking key in contact with the edge wall 54 of the driving lug when the latter is at the terminus of its helical channel. This arrangement will hold the driving lug locked in its helical channel and permit torque to be applied to the safety joint in either direction of rotation without the joint becoming disengaged.

The locking keys extend toward the mandrel from an end of a locking sleeve 56, with which they are unitary. They are spaced 120° apart, and obviously the keyways 42 also are spaced 120° apart to receive the locking keys in sliding relationship. The locking sleeve is positioned within the barrel 10 in sliding relationship, but is restrained from rotating relative to it by axially disposed grooves which are formed in the radially exterior surface of the locking sleeve and engage in a sliding relationship projections which extend inwardly from the inner wall of the barrel. In the embodiment shown, the projections take the form of set screws 58 which are screw-threaded through the wall of the barrel 10 with the nose 60 of each screw forming a projection which protrudes within the barrel and engages a respective groove 62. The locking sleeve, and hence the locking keys, are free to move along only a particular axial path relative to the barrel.

A spiral spring 64 is placed between the edge 66 of the locking sleeve and an edge 68 of the collar 12 to continuously bias the locking sleeve outwardly of the barrel. The outward travel of the locking sleeve may be limited by the axial dimension of the grooves 62; that is, the grooves may be proportioned to cause the projections 60 to engage the ends 70 of the grooves to prevent the locking sleeve from further movement outwardly of the barrel. Alternatively, the outwardly travel of the locking sleeve may be blocked by the engagement of its axially disposed edge 72 with the driving lugs 30, as illustrated in Figure 4.

A sleeve 74 is placed within the barrel in radially spaced relationship to the inner wall thereof and fixed at one end to the collar 12. The spiral spring is placed within the annular space 76 between the sleeve and the barrel, which elements form a protective chamber for it.

It will be appreciated that the above-described structure will cause the barrel and the locking sleeve to rotate as a unit, with no relative rotary displacement between these parts. Thus the position of the locking keys relative to their complementary keyway on the mandrel will be governed by the position of the barrel relative to the mandrel. Ultimately the position of the barrel with respect to the mandrel is controlled by the position of the driving lugs in their respective helical channels.

The terminal wall 28 of each helical channel is so positioned that when the edge 36 of its respective driving lug abuts it the keyways 42 in the mandrel will be in alignment with the locking keys 48. The corners of the locking keys are relieved by a bevel 78. When the locking keys approach alignment with their complementary keyways the bevel will coact with the edge 80 of the entrance of the keyway through the pressure of the spiral spring 64 to assist in rotating the barrel relative to the mandrel to help seat the driving lugs at the termini of their respective helices and bring the keyways in alignment with the locking keys.

As has been explained heretofore, the keyways extend radially into the mandrel to a greater depth than do the helical channels, and their radially inwardly surfaces 50 are substantially an extension of the circumferential surface of the reduced portion 22 of the end of the mandrel. Therefore, when the barrel assembly and the mandrel are brought together the locking keys will contact and ride on the shoulder 20 while the driving lugs are proceeding along their helical channels, and this action will continue until the driving lugs reach the termini of their respective channels, at which time the keyways are brought into alignment with the locking keys.

It will be apparent from the above description of parts and their method of cooperation that the safety joint will connect automatically when the parts of it are brought together in axial relationship. The construction is such that it does not require rotating one part relative to the other by some outside means, such as a rotary table or tongs, to make the connection secure.

Conversely, when the locking keys are withdrawn from their respective keyways and tension is applied between the barrel assembly and the mandrel, the driving lugs will engage the respective transverse surfaces 82 of the helical channels to cause the barrel to rotate relative to the mandrel in a direction opposite to that which occurred while connecting the joint until the lugs are cleared of the channels and disengaged from the mandrel.

There is a packing element 84 positioned between the locking sleeve and the portion 22 of the mandrel and another packing element 86 positioned between the locking sleeve and the radially outer surface of the sleeve 74 to permit the locking sleeve to move slidably on these portions of the apparatus while confining the well fluids to the axial passages within the safety joint.

The procedure for disconnecting the joint will now be explained. The locking sleeve has an inner circumferential groove 88 formed in its inner wall to receive a disengaging tool such as is shown in Figure 6. As exemplified in this figure, the disengaging tool may comprise an elongated member 90 which can be inserted into the string of casing until its end portion is adjacent the location of the groove. Two arms 92 and 94 are pivotally mounted at the end of the elongated member in a manner to swing radially outwardly, and cantilever springs 96 bias them in this direction. The free ends of the arms have relatively sharp corners 98 which are formed to enter into the groove and engage the shoulder 100 when the arms are extended. The disengaging tool is employed to retract the locking sleeve inwardly of the barrel and away from the mandrel to withdraw the locking keys 48 from their respective keyways. When this is done and tension is placed on the safety joint, the driving lugs will slide out of their helical channels and the joint will disconnect. The groove 88 is located on the locking sleeve in a position to lie relatively close to the terminal end 102 of the mandrel when the safety joint is connected. It is desired to place the groove in this location to reduce the possibility of apparatus, which might be inserted through the casing from time to time while the well is being drilled, engaging the groove while it is being withdrawn from the well and thus retracting the locking sleeve and releasing the safety joint. It will be appreciated that the disengaging tool is constructed to permit the arms of it to clear the top of the mandrel when they are extended to engage the groove 88.

It is apparent from the above description that the safety joint of this invention achieves the objects set forth at the beginning of the specification. It is obvious that modifications may be made to this apparatus without departing from the invention concept. Therefore it is desired that this invention not be limited to the specific exemplary embodiment described herein, but that it include all equivalents within the scope of the appended claims.

I claim:

1. In a safety joint a barrel, a mandrel having a cylindrical surface on one end portion thereof telescopically positioned within one end of said barrel, a cylindrical extension on the said end of said mandrel of smaller external diameter than said cylindrical surface and joined to said surface by a shoulder, a helical channel in said cylindrical surface open at said shoulder and extending from said shoulder along said cylindrical surface and terminating on said cylindrical surface, a driving lug extending inwardly from the inner surface of said barrel and engaging said helical channel in sliding contact when said barrel and mandrel are telescoped together and operating automatically to rotate said barrel relative to said mandrel to place said driving lug at the terminus of said helical channel, a keyway formed in said cylindrical surface and disposed transversely of said helical channel, said keyway having an open end at said shoulder to receive a key, a key proportioned to be received in said keyway and means to maintain the lower end of said key above the lower end of said driving lug, means biasing said key continuously in an axial direction toward said mandrel and into contact with said shoulder as said driving lug engages said helical channel, said key proportioned to engage said shoulder and slide circumferentially thereon as said driving lug and said helical channel co-operate to rotate said barrel relative to said mandrel, the said open end of said keyway being disposed on said shoulder to receive said key at the time said driving lug abuts the terminus of said helical channel to thereby secure said driving lug at said terminus, said biasing means operating automatically to project said key into said keyway when the safety joint is fully engaged.

2. A safety joint comprising a hollow cylindrical outer member, a collar connected to one end of said outer member and having a circumferential portion extending radially inwardly thereof, a substantially cylindrical inner member having one end detachably telescoped within the other end of said outer member, a helical channel formed in the circumferential surface of said inner member, an entrance for said helical channel at a transversely disposed surface of said inner member, said helical channel progressing continuously along the circumferential surface of said inner member from said entrance and terminating at an axially disposed surface formed in the body of said inner member, an axially disposed keyway formed in the circumferential surface of said inner member and positioned across said helical channel, an entrance for said keyway at said transversely disposed surface, a driving lug projecting radially inwardly from the interior surface of said outer member and slidably received by said helical channel to rotate said outer member automatically relative to said inner member upon the application of axial force between said inner member and said outer member, a cylindrical sleeve disposed concentrically within said outer member and affixed at one end to said collar and extending axially toward the said other end of said outer member, said sleeve being proportioned with an external diameter less than the internal diameter of said outer member to define an annular chamber between said sleeve and the inner walls of said outer member, a locking sleeve slidably mounted within said outer member with one end thereof disposed within said annular chamber, a helical spring disposed within said annular chamber and engaged between said collar and the said one end of said locking sleeve to bias said locking sleeve toward the said other end of said outer member, means to retain said locking sleeve within said outer member while permitting axial movement thereof, a unitary locking key projecting from the other end of said locking sleeve and said means maintaining the lower end of said locking key above the lower end of said driving lug, said locking key being proportioned to engage said transversely disposed surface of said inner member through the action of said helical spring when said inner member and said outer member are telescoped together and to slide circumferentially on said transversely disposed surface as said inner member and said outer member relatively rotate through the interaction of said driving lug and said helical channel, said entrance for said keyway being positioned on said transversely disposed surface to receive said locking key when said driving lug reaches the terminus of said helical channel to dispose said locking key in a position abutting said driving lug to thereby lock said outer member to said inner member while preventing relative rotary motion between the parts, axially aligned passageways through said inner member, said locking sleeve, said cylindrical sleeve and said collar, and resilient fluid-tight packing means disposed between said locking sleeve and said cylindrical sleeve and between said locking sleeve and the interconnected said inner member to prevent leakage of fluids from the assembled safety joint.

3. In a safety joint a barrel, a mandrel having a cylindrical surface on one end portion thereof telescopically positioned within one end of said barrel, a cylindrical extension on the said end of said mandrel of smaller external diameter than said cylindrical surface and joined to said surface by a shoulder, a helical channel in said cylindrical surface open at said shoulder and extending from said shoulder along said cylindrical surface and terminating on said cylindrical surface, a driving lug extending inwardly from the inner surface of said barrel and engaging said channel in sliding contact when said barrel and mandrel are telescoped together to cause automatic relative rotation of said barrel with respect to said mandrel, a keyway formed transversely of said channel and extending from an opening at said shoulder and substantially across said channel, a complementary locking key proportioned to engage said keyway, means to maintain the lower end of said locking key above the lower end of said driving lug, said locking key being biased toward said mandrel to engage said shoulder in sliding contact as said barrel rotates relative to said mandrel and to slide into said keyway when said driving lug is at the terminus of said channel to lock said driving lug in said channel, and means to withdraw said locking key from said keyway to permit said driving lug to be disengaged from said channel.

4. In a safety joint a barrel, a mandrel having a cylindrical surface on one end portion thereof telescopically positioned within one end of said barrel, a cylindrical extension on the said end of said mandrel of smaller external diameter than said cylindrical surface and joined to said surface by a shoulder, a plurality of helical channels formed in said cylindrical surface in circumferentially spaced apart relationship, each of said channels open at said shoulder and extending continuously from said shoulder along said cylindrical surface and terminating on said cylindrical surface in a respective radially disposed axially aligned surface, a plurality of driving lugs extending inwardly from the inner surface of said barrel in circumferentially spaced relationship corresponding to the said spaced relationship of said channels, each of said driving lugs engaging a corresponding one of said channels in sliding contact when said barrel and said mandrel are telescoped together to rotate said barrel relative to said mandrel automatically and place said driving lugs at the termini of the respective channels, a respective axially disposed keyway formed in said cylindrical surface across each of said helical channels and open at said shoulder, a complementary locking key for each of said keyways, means to maintain the lower end of each said complementary locking key above the lower ends of said driving lugs, said complementary locking key engaging said shoulder under spring pressure and sliding on said shoulder in a relative circumferential direction as said driving lugs slide along their respective helical channels and automatically entering its respective keyway under the force of said spring pressure when said driving lugs abut the termini of their respective helical channels to thereby lock said driving lugs securely at said termini.

References Cited in the file of this patent
UNITED STATES PATENTS

| | | |
|---|---|---|
| 966,925 | Kittredge | Aug. 9, 1910 |
| 995,966 | Hill | June 20, 1911 |
| 1,041,712 | Gale et al. | Oct. 15, 1912 |
| 1,113,556 | Hill | Oct. 13, 1914 |
| 1,883,071 | Stone | Oct. 18, 1932 |
| 2,015,786 | Corcano | Oct. 1, 1935 |
| 2,067,377 | Burns et al. | Jan. 12, 1937 |
| 2,202,261 | Osmun | May 28, 1940 |
| 2,210,815 | Linney | Aug. 6, 1940 |
| 2,586,015 | Edwards | Feb. 19, 1952 |
| 2,648,553 | Ulrich | Aug. 11, 1953 |
| 2,673,751 | Finch | Mar. 30, 1954 |
| 2,804,319 | Weber | Aug. 27, 1957 |

Notice of Adverse Decision in Interference

In Interference No. 91,813 involving Patent No. 2,950,929, K. M. Nicholson, Safety joint, final judgment adverse to the patentee was rendered May 2, 1962, as to claims 1, 2, 3, and 4.

[*Official Gazette June 12, 1962.*]